C. A. PSILANDER.
TORQUE OPPOSING DEVICE.
APPLICATION FILED MAY 4, 1908.

937,329.

Patented Oct. 19, 1909.

3 SHEETS—SHEET 2.

WITNESSES:
C. L. Belcher
R. J. Dearborn

INVENTOR
Charles A. Psilander
BY
Wesley G. Carr
ATTORNEY

C. A. PSILANDER.
TORQUE OPPOSING DEVICE.
APPLICATION FILED MAY 4, 1908.

937,329.

Patented Oct. 19, 1909.
3 SHEETS—SHEET 3.

WITNESSES:
C. L. Belcher
R. T. Dearborn

INVENTOR
Charles A. Psilander
BY
Wesley G. Carr
ATTORNEY

UNITED STATES PATENT OFFICE.

CHARLES A. PSILANDER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TORQUE-OPPOSING DEVICE.

937,329.      Specification of Letters Patent.      Patented Oct. 19, 1909.

Application filed May 4, 1908. Serial No. 430,842.

*To all whom it may concern:*

Be it known that I, CHARLES A. PSILANDER, a citizen of the United States, and a resident of Pittsburg, in the county of Allegheny and State of Pennsylvania, have invented a new and useful Improvement in Torque-Opposing Devices, of which the following is a specification.

My invention relates to means for opposing the torques exerted by motors and has special reference to devices used in connection with electric motors operating in pairs for propelling locomotives or other vehicles.

The object of my invention is to provide apparatus which shall be simple and compact in construction and efficient and durable in operation, and which shall serve not only to oppose the torques exerted by the motors in connection with which it is used but shall also absorb the shocks and vibrations incident to the operation of electrically propelled vehicles.

Figure 1:
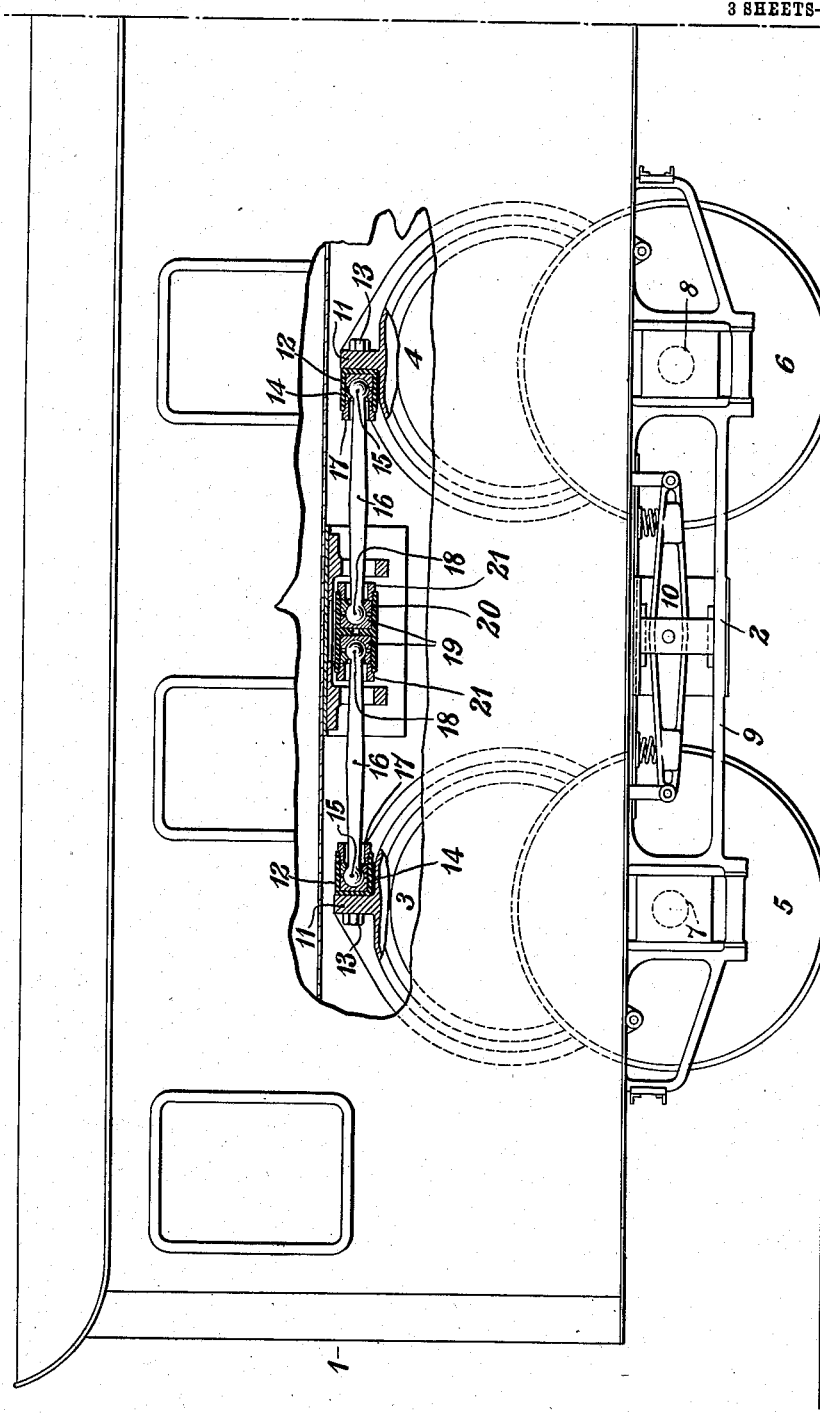
Figure 2:
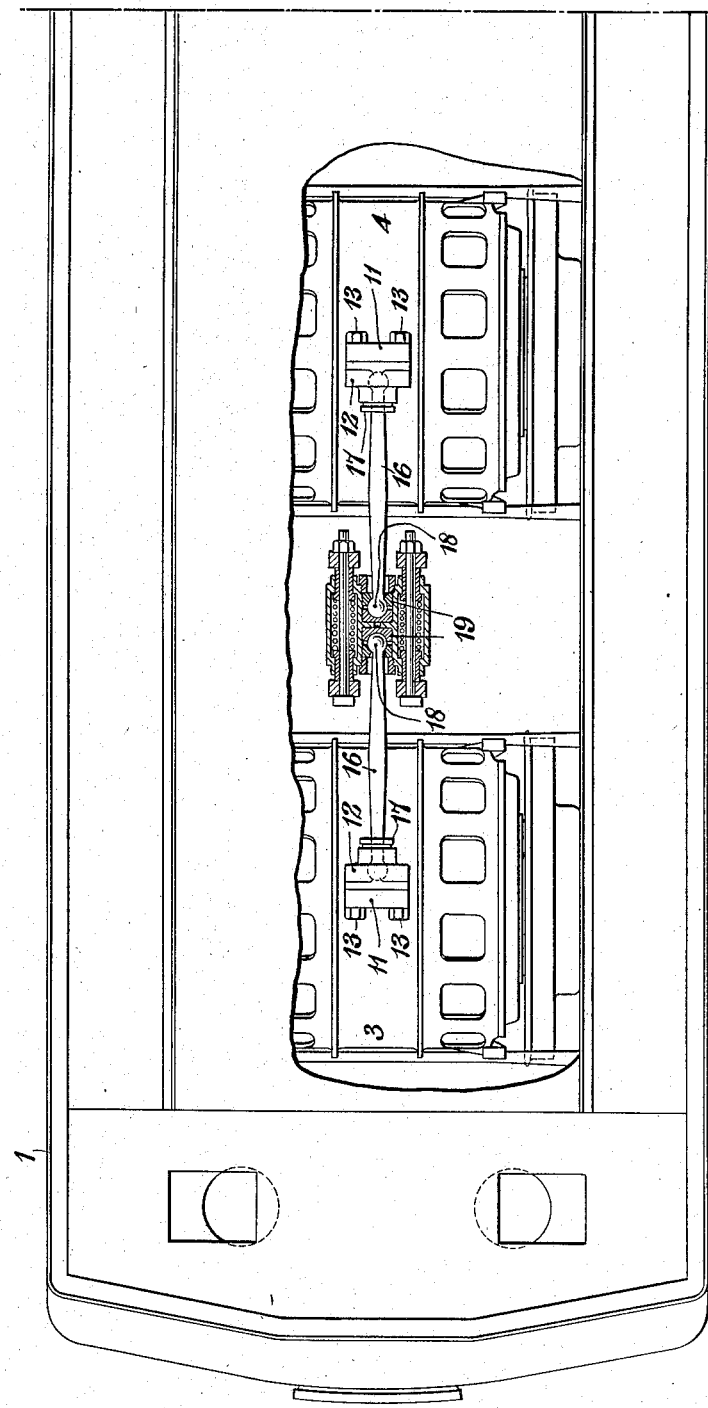
Figure 3:
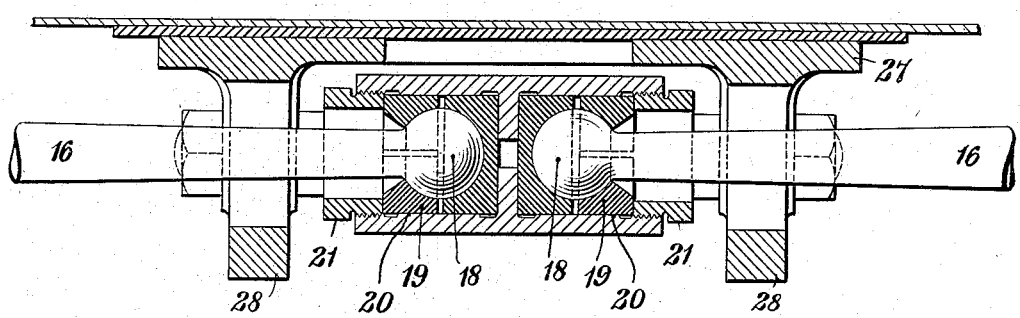
Figure 4:
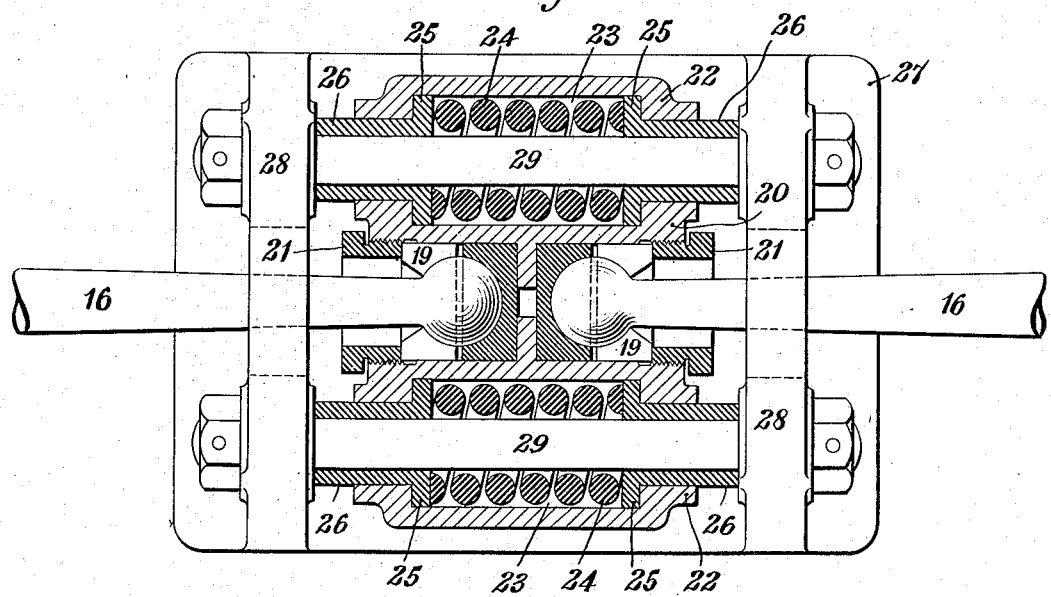
Figure 5:
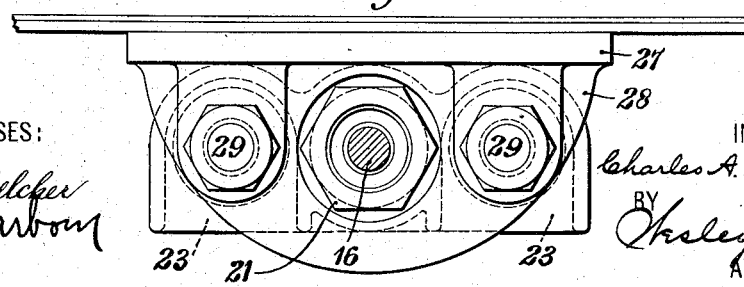

In the accompanying drawings, Figure 1 is a side elevation of one end of an electric locomotive, a portion of the body being broken away to show my torque-opposing device in section. Fig. 2 is a plan view of the portion of the vehicle shown in Fig. 1, part of the vehicle body being broken away to show the torque-opposing device, and the latter being partially shown in section. Fig. 3 is a longitudinal sectional view, on an enlarged scale, of the principal parts of the torque-opposing apparatus. Fig. 4 is a view, partially in plan, looking upward, and partially in section, of the apparatus shown in Fig. 3, and Fig. 5 is an end elevation of the structure shown in Figs. 3 and 4.

My invention is shown in the drawings as applied to an electric locomotive 1 equipped with double trucks, each truck being equipped with two motors, though only one truck 2 and one pair of motors 3 and 4 are shown. The electric motors 3 and 4 for driving the respective truck wheels 5 and 6 are shown as mounted directly above the truck axles 7 and 8 and as geared thereto by means of suitable speed-reducing gearing, the details of which, being of no particular importance to my present invention, are not shown. The motors 3 and 4 may also be supported by means of a suitable frame or cradle in any well known or desired manner, a portion 9 of the truck frame and a portion 10 of the supporting devices for the motors being shown in Fig. 1.

It is well understood that the torque exerted upon the truck wheels and axles by the motor armatures reacts upon the motor field magnets and tends to turn them upon their axes. In order to oppose this action, I provide the frame of each motor, intermediate its ends and at its top, with a lug or boss 11 and fasten thereto a box 12, by means of bolts 13, and in the box I locate a two-part socket 14 to receive a ball 15 formed upon one end of a torque-opposing rod 16, the bearing blocks being held in position by means of a tubular nut 17. The inner ends of the torque-opposing rods 16 also have ball-shaped ends 18 which are seated in two-part blocks 19 having sockets of the proper form and dimensions to receive the said ends. The socket blocks 19 are seated in chambers 20 and are held therein by means of cylindrical nuts 21 which are screwed into the ends of the chambers. The chambers 20 form integral parts of a structure which comprises lateral extensions 22 having chambers 23 in which are located coil-springs 24, the respective ends of each of which are seated against the flanged inner ends 25 of the tubular followers or pistons 26.

The parts just described are all supported from a suitable portion of the vehicle or locomotive body by means of a frame comprising a base plate or block 27 and downwardly projecting arms or brackets 28 which are provided with and connected by bolts or rods 29, the latter being surrounded by the springs 24 and the hollow plungers or followers 26.

The structure and arrangement of the several parts are such that the torque which tends to turn the motor frames upon their axes is exerted against the torque-opposing rods 16, and, since the two motor frames are connected together by the rods and coöperative devices, such displacement of the motor frames is prevented. The ball and socket connection between the torque-opposing rods and the motor frames, and that between the rods and the intermediate connecting devices, permit of such slight displacement of parts as may be necessary without any resulting binding action, and the interposition of the springs between the torque rods and the vehicle body serves to take up and absorb the vibrations which are always attendant upon the operations of vehicles of the character here shown and described.

My invention is obviously not limited to the specific type of vehicle here shown or to the specific form or arrangement of motors, it being my desire and intention to utilize my invention wherever it may be found useful in connection with motors or engines, the torques of which it is desired to oppose in such manner as to avoid injurious results from vibrations or other incidental shocks.

I claim as my invention:

1. The combination with two torque-producing members, of a pair of torque-opposing rods coupled together end to end and held against lateral movement and having their outer ends respectively connected to said members, and yielding resilient means for opposing longitudinal movement of said rods.

2. The combination with a pair of electric motors and a pair of torque-opposing rods coupled together end to end and having their outer ends connected to the respective stationary members of said motors, of a yielding resilient means for opposing longitudinal movement of said rods.

3. The combination with a pair of electric motors, of two torque-opposing rods the outer ends of which have ball and socket connections with the frames of the respective motors, of an intermediate member comprising two universal-joint connections for said rods, and a resilient supporting means for said intermediate member.

4. In an electrically propelled vehicle, the combination with a pair of propelling motors, of torque-opposing means comprising two torque-opposing rods in approximate longitudinal alinement, universal-joint connections between their inner ends, and springs interposed between said connections and the vehicle body.

5. In an electrically propelled vehicle, the combination with a pair of propelling motors, of two torque-opposing rods the outer ends of which have universal-joint connections with the respective motors, a universal-joint connecting means between the inner ends of said rods, and resilient connections between said means and the vehicle body.

6. In an electrically propelled vehicle, the combination with a pair of propelling motors, of two torque-opposing rods having universal-joint connections with the frames of the respective motors, a frame with which the inner ends of said rods make universal-joint connections, and compression springs interposed between said frame and the vehicle body.

In testimony whereof, I have hereunto subscribed my name this 30th day of April, 1908.

CHARLES A. PSILANDER.

Witnesses:
 EDWIN TIDLUND,
 BIRNEY HINES.